3,499,722
METHOD OF REMOVING ATMOSPHERE POLLUTING ODORS FROM RENDERING OR SIMILAR OPERATIONS
Howard S. Ashley, 1905 Homan Ave., Fort Worth, Tex. 76106, David W. Ashley, Sr., and Howard J. Ashley, executors of said Howard S. Ashley, deceased
Filed Feb. 25, 1966, Ser. No. 530,046
Int. Cl. B01d 53/00
U.S. Cl. 23—2
10 Claims

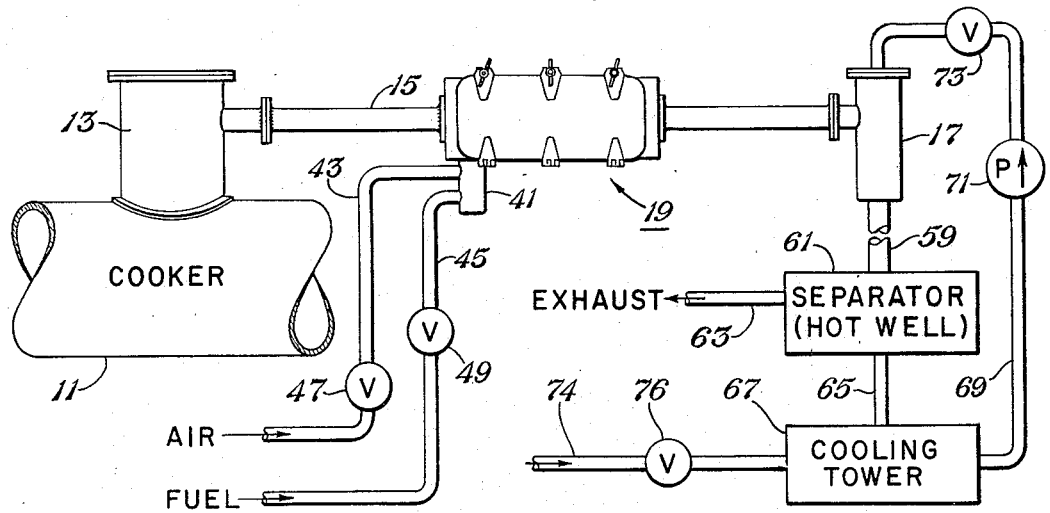
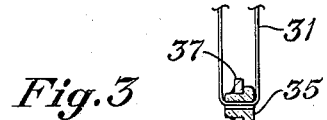
Fig. 1
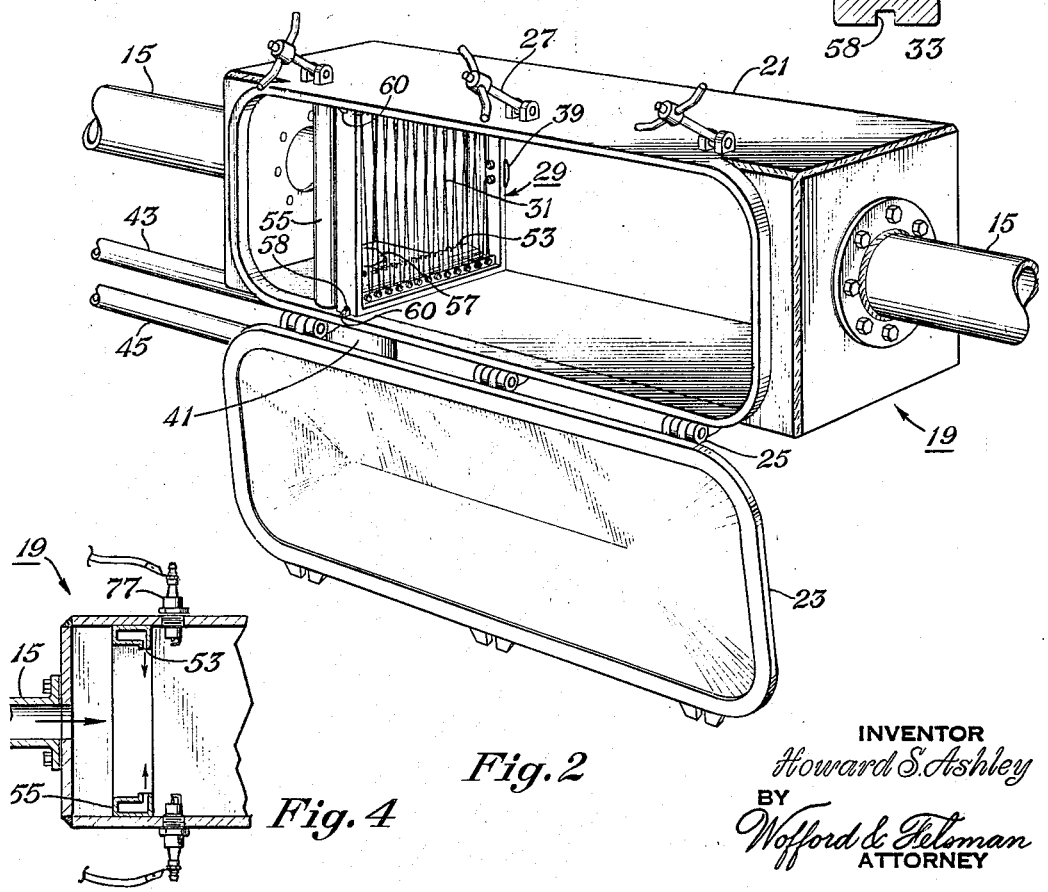
Fig. 2 Fig. 3 Fig. 4
INVENTOR
Howard S. Ashley
BY
Wofford & Felsman
ATTORNEY

United States Patent Office 3,499,722
Patented Mar. 10, 1970

ABSTRACT OF THE DISCLOSURE

A method of removing atmosphere polluting odors from systems such as rendering operations by introducing an oxidant and in selected instances a fuel into a combustion chamber located in a low pressure region between a cooker and a condenser.

---

My invention relates to systems for cleansing exhaust gases of atmosphere polluting odors, and particularly to the removal of odors generally emitted from factories and plants especially those involved in rendering operations.

Rendering operations may be defined as the processing of certain classes of usually residual or scrap materials produced as a by-product of another, primary manufacturing process. Packing house rendering operations are an almost classic example of this type manufacturing process. In packing houses primary portions of each slaughtered animal are directly processed for food consumption, while certain residual products such as horns, hoofs, intestines, etc. are subsequently processed into edible or inedible products. Some of these products are used as foods or nutritional supplements for other animals; some are used in the manufacture of inedible products such as adhesives.

The packing house rendering process involves the cooking of residual animal products while maintaining the pressure in the cooker apparatus below atmospheric pressure. The reduced pressure lessens fuel requirements by enabling vaporization of the moisture in the cooker and the animal products it contains at a temperature far below 212° F. Bacteria in animal products can be killed at temperatures of about 140° F. Therefore, fuel is wasted if the products are heated to temperatures in excess of about 140° F. Also, "bleachable fats" can be produced if the pressure of the gases inside the cooker is below atmospheric pressure.

In the past the gaseous products emitted from the cooker were introduced through a conduit into a condenser, usually a barometric condenser, which produced below atmospheric pressures in the cooker. Then the water from the condenser and the gaseous products were separated and the gaseous products burned in an attempt to remove the odors from the exhaust gases. Such attempts have been unsuccessful, for packing houses continue to emit unusually offensive odors.

I recognized that previous attempts to solve the problem of packing house odors failed to prevent the water soluble gases and substances from going into solution with the condensate water. My system also utilizes a condenser, which is a highly efficient means for producing a vacuum in a cooker, but prevents the pollution of the condensate water with offensive odor causing water soluble gases.

The soluble gases from the cooker, when allowed in the past to mix with the condensate water, polluted the water to an extent that some municipalities refuse to permit its reuse. Since 86,431 gallons of water are required to condense 6000 pounds of steam to produce a vacuum of 24 inches Hg if the water has a temperature of 80° F., the requirement for using fresh condensing water imposes a burdensome expense on packing house owners. My system will prevent pollution of the condensate water and prevent further contamination of the thus sewage in municipalities in which condensate water from rendering operations and the like is dumped.

The previous systems for eradicating odors from rendering operations that permit the mixing of water soluble gases and substances with condensate water do not prevent pollution of the atmosphere with offensive odor causing gases. For once the polluted water is introduced to the atmosphere (as in a cooling tower), some of the soluble gases are liberated from the water and thereby pollute the atmosphere.

It is, therefore, the general object of my invention to produce an improved system for removing atmosphere polluting odors generally emitting from rendering or other atmosphere polluting operations.

Another object of my invention is to produce an odor removing system especially suitable for rendering operations in which a below atmospheric pressure is maintained on the cooker by condensing the steam emitted from the cooker, said system preventing the mixing of odor producing water soluble gases with the condensed water.

Another object of my invention is to provide apparatus especially useful in transforming odor causing gases and substances emitted from cookers in packing houses to odorless substances, said apparatus being effective when operating in a gaseous medium under a partial vacuum.

These and other objects are effected by my invention as will be apparent from the following description taken in accordance with the accompanying drawing, forming a part of this application, in which:

FIG. 1 is a schematic view of a system embodying the principles of my invention;

FIG. 2 is a perspective view of a combustion chamber of a preferred type used with my system;

FIG. 3 is a fragmentary side elevational view of a portion of an electric heating grid used in the combustion chamber shown in FIG. 2; and FIG. 4 is a fragmentary side elevational view of a modified form of combustion chamber.

Referring initially to FIG. 1, the numeral 11 designates a cooker of the type used in packing houses. It has a gooseneck portion 13 and means (not shown) for introducing residual animal by-products or scraps thereto. This cooker may be of any one of the many suitable forms utilized (usually steam jacketed) in such operations and may have a gas furnace or other suitable form of heating device for raising the temperature of the residual animal products and the broth in which they are cooked to a suitable temperature. This cooker is hermetically and liquid sealed so that a vacuum may be maintained therein.

A conduit 15 extends from a region of the gooseneck portion 13 to a condenser 17. To maximize the efficiency of condensation, the condenser may be of the barometric type so that the condensing water is sprayed directly into the steam.

Interposed in conduit 15 is a combustion chamber 19. I refer now to FIG. 2, which illustrates with better clarity the construction of a preferred combustion chamber. This particular chamber has a box frame 21, which is fluid sealed when the door 23 supported by hinges 25 is clamped shut by the winged nut type clamping means 27. A suitable gasket (not shown) may be provided to seal the door when clamped shut.

Disposed in the combustion chamber is an ignition element 29 which in this instance is composed of an electrically conductive wire 31 that is supported within a framework 33 by means of the ceramic insulators 35 held in place by support bracket 37 (see FIG. 3). The wire 31 is threaded between the insulators which are positioned on the frame to be close together as shown. The framework 33 is sized such that the wire 31 of the ignition element extends almost completely across the combustion chamber. The wire is connected by a suitable electric plug 39 to a source (not shown) of electrical energy. The electric wire 31 is heated to a red hot condition when supplied with electrical energy and is provided to facilitate the oxidation of the combustible gaseous substances emitted from the cooker. The close spacing of the heated wire results in the introduction of large quantities of heat into the gaseous substances flowing through the combustion chamber making the substances even easier to oxidize.

To further facilitate oxidation of combustible materials emitted from the cooker. I provide a manifold 41 which communicates with a free oxygen-containing gas such as air conduit 43 and a fuel conduit 45, each of said conduits having conventional flow control means such as valves 47, 49. The resulting air-fuel combination is discharged into the combustion chambers through a plurality of nozzles or orifices 53 in a removable portion 55 of manifold 41. A threaded connection 57 is provided to enable convenient removal of removable portion 55 of the manifold so that it may be cleaned. The ignition element 29 may be easily removed from the combustion chamber since the electrical plug 39 may be easily disconnected and since the framework 33 around the wires may be easily moved from the combustion chamber. In this regard the framework has slots 58 formed along the length of its upper and lower exterior portions, and elongated protrusions 60 extend into these slots to secure the framework in a position transverse to the longitudinal axis of the combustion chamber.

The nozzles or orifices 53 are transversely aligned with respect to the longitudinal axis of the combustion chamber and are oriented to discharge the air-fuel combination in a substantially parallel direction with respect to the plane containing the wires 31 of the ignition element 29. This arrangement is effective in producing a transverse zone of rapidly oxidizing or combusting materials. All of the gaseous materials passing through the combustion chamber must past through the resulting high temperature and high pressure zone and, as a consequence, all the combustible in the gaseous substance, including the water soluble and insoluble materials, are oxidized. The pressures of the gaseous substances in the above-described high pressure region in the combustion chamber reach relatively high values but the pressure upstream from the ignition element 29 and the pressure downstream therefrom remain below atmospheric and thus the flow of gaseous substances through conduits 15 is maintained.

As is illustrated in the drawing, the cross sectional area of the interior of the combustion chamber 19 is much greater than the cross sectional area of the interior of the conduit 15. Therefore, the gases entering the combustion chamber from the conduit decrease in velocity, a feature which makes the maintenance of combustion in the region around the ignition element 29 easier than is otherwise possible. The velocity of the gases which normally pass through conduit 15 may easily be several thousand feet per minute, but since the gas velocity is a function of the cross sectional area of its fluid flow conduit means, by increasing the size of the interior of the combustion chamber the velocity may be lowered to any selected value. I prefer that the velocity of the gas in a combustion chamber be in the vicinity of 1000 feet per minute or lower.

The substances leaving the combustion chamber are carried through conduit 15 to the condenser 17 and, upon being condensed, flow through another conduit 59 to a separator 61. Here the water condensate, the gases, and the solid products of combustion are separated. In a common type separator (called a "hotwell" in the meat packing industry) the water is passed through a number of baffles which causes the solid particles to settle to the bottom of the separator and which causes the water soluble gases as well as the insoluble gases to rise to the top of the separator. The gases are thereafter introduced to the atmosphere through exhaust 63. These gases are free of offensive odors since all the combustible, odor causing gaseous substances emitted by the cooker have passed through combustion chamber 53 and have been oxidized. There is, therefore, no contamination of the water condensate. Thus, the odor free exhause gases may be dispersed into the atmosphere.

The water condensate may be reused since it has not been contaminated with odor causing gases or substances. Thus, a conduit 65 extends from separator 61 to a cooling tower 67 and another conduit 69 connects the cooled water in the cooling tower with the condenser 17. A pump 71 may be provided in conduit 69 to cause water flow from the cooling tower to the condenser and a valve 73 provided to regulate the amount of flow. Outside or make-up water may be provided to a collecting pan (not shown) through a conduit 74 and the level of the water controlled by a conventional float valve 76.

Other forms of ignition elements are within the broad scope of my invention, and in FIG. 4 is illustrated a combustion chamber 19 having a plurality of conventional spark plugs 77 which may be fired to maintain combustion in the chamber. Devices of this nature are not so practicable as is the one illustrated in FIG. 2, for the electric grid type ignition element induces a large amount of energy into the gaseous substances and is thus more effective in promoting and maintaining combustion. However, where the pressure inside the combustion chamber or the conduit 15 is not greatly below atmospheric pressure and where the amount of combustible materials is quite high per unit volume, the spark type ignition element illustrated in FIG. 4 may be quite effective.

From the above description of the apparatus used in my system, it may be seen that my system for removing atmosphere polluting odors heretofore emitted from rendering operations may be expressed as follows:

First, the residual products, such as animal scraps, are cooked in a fluid sealed chamber. Next, the gaseous substances and steam produced during the above cooking are condensed in a fluid conduit that communicates with the cooker so that pressures of the gaseous substances in the cooker are reduced to a value below atmospheric pressure. Oxidation of the combustible materials in the gaseous substances, including the water soluble and insoluble particles, occurs in a region of the sealed conduit or preferably in a combustion chamber located upstream from the region where the condensation takes place. Therefore, the gaseous substances are burned clean of all odor causing materials, some of which would otherwise go into solution with the water condensate, thereby eliminating the problem of trying to cleanse the water condensate of the offensive gases. Finally, the water condensate, the gases and the solid products of combustion are separated to enable reuse of the cleansed water and reuse or discharge into the atmosphere of the resulting odor free gases.

To efficiently effect the combustion mentioned in the above-description, the oxidation should occur in a combustion chamber having a larger cross sectional area than does the sealed conduit so that the velocity of the gaseous substances is reduced. Moreover, an ignition element, preferably of the electric grid heater type shown in FIGS. 2 and 3, is inserted into the combustion chamber to increase the efficiency of combustion, and an air-fuel combination introduced into the combustion chamber in the region of the ignition element to further facilitate oxidation or combustion of the odor causing materials.

It should be apparent from the foregoing that I have provided an invention having significant advantages. The oxidation or combustion of the gaseous substances emitted from a rendering operation cooker while the gaseous substances are at a pressure below atmospheric pressure converts the water soluble as well as water insoluble materials to solids and gases that may easily be separated from the condensate water, thereby enabling the maintenance of the below atmospheric pressure by the convenient means of a condenser. Thus the condensate water may be reused again and again since it does not become contaminated. Moreover, my system enables the complete eradication of offensive odors from packing house operations in a manner that is so efficient and economical both in installation and operation, so that it can be installed in any packing house. My system not only prevents the contamination of the atmosphere with offensive odors but simultaneously prevents the contamination of water condensate, and may be easily incorporated into existing systems with little additional expense. Moreover, the above described electric grid type ignition element and combustion chamber are highly efficient means for maintaining combustion in gaseous substances that have a high moisture content and a pressure below atmospheric pressure. Thus, the various features of my invention cooperate to solve the long standing problem of removing offensive odors from rendering operations of the type used in packing houses.

While I have shown the apparatus used in conjunction with my invention in only a few forms, it should be understood that it is not so limited, but is susceptible in various changes and modifications without departing from the spirit thereof.

I claim:
1. The removal of atmosphere polluting odors from rendering operations by a method which comprises the steps of:
   cooking materials that are to be rendered as usuable products;
   injecting a free oxygen-containing gas into the gaseous substances produced by said cooking;
   passing said gaseous substances and said free oxygen-containing gas through a combustion zone and combusting and oxidizing the combustibles in the gaseous substances;
   condensing the steam from the resultant gaseous substances to lower the pressure of the gaseous substancces; and
   separating the condensate water, the gases, and any solid products of combustion.
2. The method defined by claim 1 which further comprises reducing the velocity of the combustibles prior to oxidizing them.
3. The method defined by claim 1 which further comprises igniting by electrically energized means said combustibles.
4. The method defined by claim 1 which further comprises injecting a fuel into the gaseous substances.
5. The removal of atmosphere polluting odors from gaseous substances associated with material being treated, by a method which comprises:
   heating the materials that are to be treated;
   injecting a free oxygen-containing gas into the gaseous substances produced by said heating;
   passing said gaseous substances and said free oxygen-containing gas through a combustion zone and combusting and oxidizing the combustibles in the gaseous substances;
   lowering the pressure of the gaseous substances; and
   separating the gases and any solid products of combustion.
6. The method defined by claim 5 which further comprises reducing the velocity of the combustibles prior to oxidizing them.
7. The method defined by claim 5 which further comprises igniting by electrically energized means said combustibles.
8. The method defined by claim 5 which further comprises injecting a fuel into the gaseous substances.
9. The method defined by claim 5 in which the velocity of the combustibles prior to oxidation does not exceed 1,000 feet per minute.
10. The method defined by claim 5 in which the pressure of the gaseous substances is lowered to enable boiling of said materials that are to be treated in a range of temperatures from 140 to 212 degrees F.

References Cited

UNITED STATES PATENTS

| | | | |
|---|---|---|---|
| 136,208 | 2/1873 | Bond | 23—2 |
| 2,801,906 | 8/1957 | Bratton | 23—2 |
| 2,940,835 | 6/1960 | Scofield | 23—2 |
| 3,218,134 | 11/1965 | Walsh | 23—2 |

OSCAR R. VERTIZ, Primary Examiner

E. C. THOMAS, Assistant Examiner

U.S. Cl. X.R.

23—290.5; 260—412.6